United States Patent

Lowry et al.

[15] 3,697,014

[45] Oct. 10, 1972

[54] TAPE HANDLING MECHANISM FOR COMPUTER

[72] Inventors: Alan B. Lowry, Canton; Gregory Mathus, Cambridge, both of Mass.; Herbert Morello, Phoenixville; Robert J. Miller, Salford, both of Pa.

[73] Assignees: Data Packaging Corporation, Cambridge, Mass.; Digital Information Devices, Inc., Norristown, Pa. ; part interest to each

[22] Filed: Nov. 27, 1970

[21] Appl. No.: 93,467

Related U.S. Application Data

[63] Continuation of Ser. No. 781,875, Dec. 6, 1968, abandoned.

[52] U.S. Cl. .................................. 242/182, 242/197

[51] Int. Cl. ..... G11b 15/58, G11b 23/12, G03b 1/04

[58] Field of Search ..................... 242/182, 197–200; 274/4 C, 11 C; 352/72–78

[56] References Cited

UNITED STATES PATENTS

| | | | |
|---|---|---|---|
| 2,926,861 | 3/1960 | Murdoch | 242/200 |
| 2,941,741 | 6/1960 | Bilsback | 242/199 |
| 3,250,482 | 5/1966 | Whitnah | 242/197 |

*Primary Examiner*—Leonard D. Christian

[57] ABSTRACT

A cartridge having a stabilizer system for a standard IBM-type computer tape reel that may be placed in the cartridge for recording and subsequently be removed from the cartridge for use on a computer. A separate take-up reel is provided in the cartridge onto which the tape is wound. Each reel is movable axially and laterally in the cartridge and can be engaged by external drive spindles.

34 Claims, 9 Drawing Figures

INVENTORS
ALAN B. LOWRY
GREGORY MATHUS
HERBERT MORELLO
ROBERT J. MILLER
BY
Wolf, Greenfield & Hieken
ATTORNEYS INVENTORS
ALAN B. LOWRY
GREGORY MATHUS
HERBERT MORELLO
ROBERT J. MILLER
BY Wolf, Greenfield & Hieken
ATTORNEYS

INVENTORS
ALAN B. LOWRY
GREGORY MATHUS
HERBERT MORELLO
ROBERT J. MILLER

BY Wolf, Greenfield & Hieken
ATTORNEYS

INVENTORS
ALAN B. LOWRY
GREGORY MATHUS
HERBERT MORELLO
BY ROBERT J. MILLER

Wolf, Greenfield & Hieken
ATTORNEYS

TAPE HANDLING MECHANISM FOR COMPUTER

This application is a continuation of Ser. No. 781,875, filed Dec. 6, 1968 and now abandoned.

This invention relates to the handling of magnetic tape and more particularly comprises a new and improved magnetic tape cartridge for computer tapes and reels. The cartridge is designed for use either with a special input device for applying information to the tape or with a direct input and readout computer system.

It is presently the practice in connection with many input devices to provide the operator with an IBM-type compatible reel loaded with tape, and the operator is required to thread the tape in the input device as part of the regular set up prior to regular operation. After the desired input has been recorded on the tape, the operator rewinds the tape on the reel and it is subsequently transferred to the computer. Careless handling of the tape at the input device or at the computer can damage the tape and may result in inaccurate or inconsistent recordings and readings. In accordance with the present invention a cartridge is provided for the standard reel and tape, which eliminates the need for careful and skillful handling. More particularly, this invention is embodied in a simple tape cartridge system which enables unskilled clerical personnel to handle the tape both at an input device and a computer installation.

One important object of this invention is to provide a self contained cartridge for computer tape, which permits recording on and reading of the tape without removing the reel or reels from the cartridge.

Another important object of this invention is to provide a cartridge for IBM-type compatible reels, which allows the loaded reel inside to be used while in the cartridge as well as when it is removed.

A more specific object of this invention is to provide a cartridge for an 8½ inch IBM-type compatible reel, which is just slightly larger than the reel itself but which nevertheless has means for winding the tape between the reel and a separate take-up reel in the cartridge.

Yet another important object of this invention is to provide a cartridge for computer tape which is sealed when not in use to protect the tape inside.

Yet another specific object of this invention is to provide means for aligning a reel in a cartridge with an external spindle.

Still another important object of this invention is to provide a tape cartridge which supports a supply and take-up reel in a manner that allows drive spindles to couple both mechanically and pneumatically to them.

To accomplish these and other objects, the tape cartridge of this invention comprises a cover and a base adapted to be opened and closed. A supply reel stabilizing system is provided in the cartridge toward the rear thereof which is designed to carry an IBM-type compatible reel. The stabilizing system allows the reel to move a limited extent both axially and laterally so as to allow the reel to align itself with the drive spindle and to move away from a brake pad which it ordinarily bears against to prevent rotation. A separate take-up reel is provided in the cartridge, which is also movable both axially and laterally for the same reasons as the supply reel. An opening in the front wall of the cartridge enables the course of tape between the two reels to be withdrawn from the cartridge into contact with an external input or reading head. The opening in the front wall of the cartridge also enables the tape on the take-up reel to extend out of the cartridge so that the cartridge interior may be made relatively small.

These and other objects and features of this invention along with its incident advantages will be better understood and appreciated from the following detailed description of one embodiment thereof, selected for purposes of illustration and shown in the accompanying drawing, in which.

Figure 1:
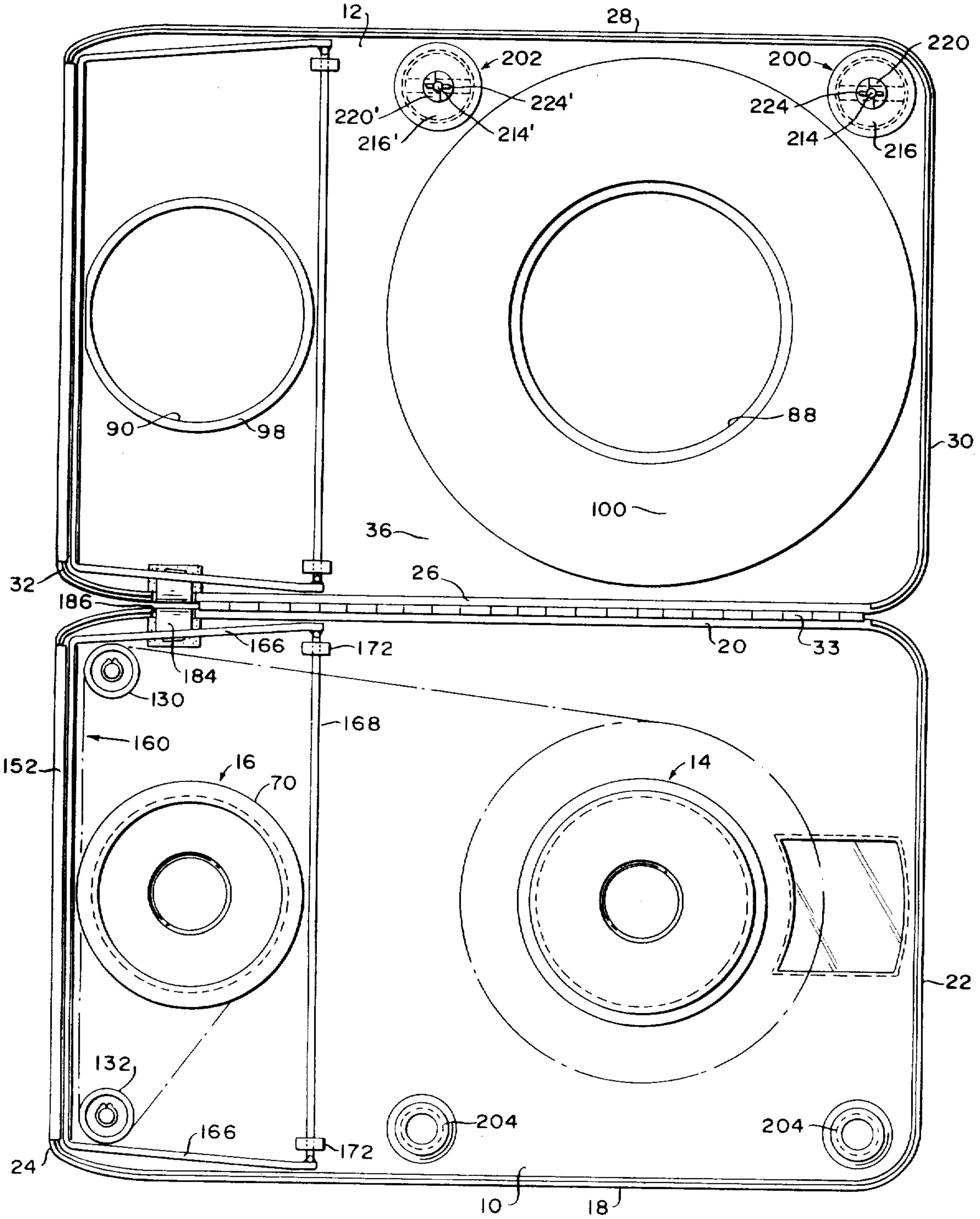
FIG. 1 is a plan view of an open empty cartridge constructed in accordance with this invention.
Figure 2:
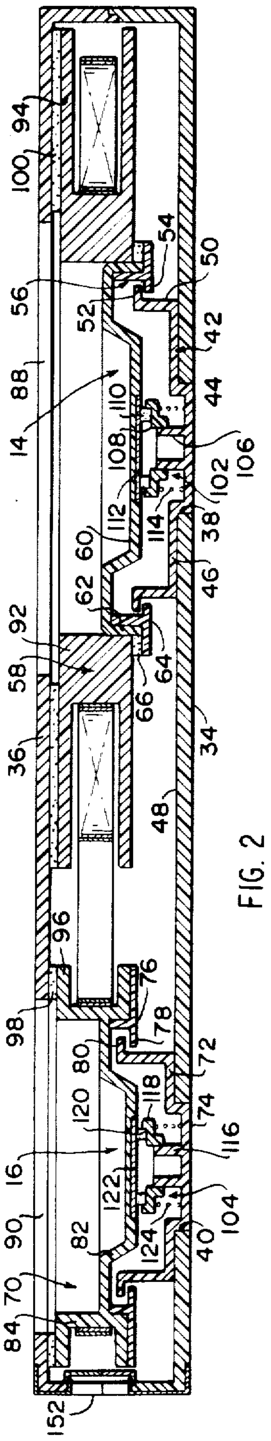
FIG. 2 is a cross-sectional view of loaded cartridge in its inoperative position.

The cartridge of this invention is shown in FIGS. 1 and 2 to include in its general organization a cover 10, a base 12, a supply reel stabilizer system 14, and a take-up reel and stabilizer system 16. The details of the cartridge and the manner in which it may be used are described in detail below. While in the following description the part 10 is referred to as a cover and the part 12 as a base, it is to be understood that these are terms selected for convenience, and there is no special orientation of the cartridge which requires that one or the other halves of the case be placed at the top or the bottom. In fact, in one specific installation for which this cartridge is suitable, it is used with the cover and base oriented vertically.

The cartridge case which includes the cover 10 and base 12 not only provides a housing for the reels and their stabilizing systems but in addition defines a sealed chamber for them as well. The cover 10 has side walls 18 and 20, rear wall 22 and front wall 24 that align in edge to edge relationship with side walls 26 and 28, rear wall 30 and front wall 32 of the base. The side walls 20 and 26 of the cover and base are joined by a piano hinge 33 that allows the case to be opened fully so that the top wall 34 of the cover and the bottom wall 36 of the base lie in the same or parallel planes.

The wall 34 of the cover 10 has a pair of circular holes 38 and 40 in which the stabilizing systems for the supply and take-up reels are mounted. Thus the stabilizing system 14 for the supply reel includes a dish-shaped plate 42 having a central hub 44 which is cemented into the opening 38. The flat wall 46 of the plate 42 abuts against the inner surface 48 of the top wall 34, and the plate also includes a peripheral flange 50 and an outturned skirt 52. The skirt 52 cooperates with the inwardly extending flange 54 of ring 56 to limit movement of the supply reel 58 supported on the stabilizer system 14. It is evident in FIG. 2 that the ring 56 may move axially between positions wherein the flange 54 engages the skirt 52 and the inner surface 48 of the wall 34. It is also evident that a certain amount of lateral play is provided the ring 56 by virtue of the gap between the outer diameter of the flange 50 on plate 42 and the inner diameter of the flange 54 of the ring.

The ring 56 carries an imperforate support 60 having a down turned skirt 62 cemented to the cylindrical wall 64 of the ring. Thus once the parts are assembled as shown in FIG. 2, the support 60 and ring 56 are inseparable. The outwardly extending flange 66 at the edge of the skirt 62 cooperates with the skirt to define a seat for the separate supply reel 58.

A very similar stabilizer system 16 is provided for the take-up reel 70. Thus, the system 16 includes a stabilizing plate 72 having a central hub 74 which is cemented into the opening 40 in top wall 34. Retaining ring 76 has an inwardly extending flange 78 that overlaps the skirt 80 of the plate 72 to limit the extent of axial and lateral movement of the take-up reel 70. In the preferred form shown, the take-up reel 70 is integrally formed with the imperforate support 82, and the inner diameter of the hub 84 of the reel 70 fits tightly over the cylindrical wall 86 of the ring.

The bottom wall 36 as shown in FIG. 1 includes a pair of large circular openings 88 and 90 which provide access to the hubs 84 and 92 of the take-up and supply reels respectively. Rubber rings 98 and 100 which form both a brake for the reels as well as a seal about the openings are secured to the wall 36 opposite the outer flanges 94 and 96 of the supply and take-up reels respectively. Consequently, when the reels bear against the rubber rings 98 and 100, a seal is formed about the openings which prevents particles from entering the cartridge so as to protect the tape, and the reels are not free to rotate.

The reels 58 and 70 are urged into contact with the rings 98 and 100 by the spring and bearing assemblies 102 and 104 disposed in the hubs 44 and 74 respectively of the plates 42 and 72. The hub 44 is shown in FIG. 2 to include a cylindrical wall 106 as an integral part thereof on which axially slides bearing retainer 108. The bearing retainer 108 in turn carries a bearing 110 which may be in the form of a lubricated annular disc, ball bearings, or any other suitable type. The bearing 110 engages a pressure plate 112 mounted on the lower surface of the imperforate support 60. A helical spring 114 is disposed between the bearing retainer 108 and the bottom of the hub 44 and yieldably urges the bearing retainer 110 with its bearing upwardly against the plate 112. This in turn pushes the support 60 away from wall 34 and toward wall 36 so that the outer flange of the supply reel 58 bears against the rubber ring 100. Consequently the reel is held against rotation, and the tape wound upon it will not unwind.

The spring and bearing assembly 104 for the take-up reel 70 includes cylindrical wall 116, bearing retainer 118, bearing 120, pressure plate 122 and spring 124 which all perform the identical function of their like named parts in the stabilizer system for the supply reel 58.

While the take-up reel 70 is permanently fixed in the cartridge although free to move with ring 86 on plate 72 of the stabilizing system 16, the reel 58 in the cartridge is readily removable and takes the form of a standard IBM-type compatible reel suitable for use on all forms of computers. The details of the reel 58 are not shown but rather only its silhouette, and typically it may be the reel shown in U.S. Pat. No. 3,229,928. The reel is readily removable from the stabilizer system 14 when the cartridge is open, and it is intended that it may be transferred from the cartridge directly on to a computer transport spindle.

Figure 7:
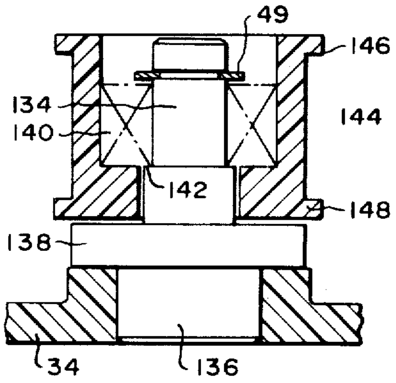
FIG. 7 is a fragmentary cross-sectional view of one of the idler rollers in the cartridge.

In FIG. 1 the path of the tape from the supply to the take-up reel is suggested by the broken lines T. It will be noted in that figure that the tape leaves the supply reel 58 tangentially from its outermost convolution and travels adjacent the hinged walls 20 and 26 to the idler rollers 130 and 132 and back to the take-up reel 70. The idler rollers are identical, and one is described in connection with the detailed drawing of FIG. 7. In that figure it will be noted that a post 134 having a cylindrical base 136 is anchored in the wall 34 of the cover 10, and its flange 138 engages the inner surface of the wall 34 to provide a precise position for the post. A roller bearing 140 rests on the shoulder 142 of the post 134, and the roller bearing 140 in turn supports the roller 144 which is free to rotate with respect to the post. The roller has a pair of side flanges 146 and 148 to position the tape on it. A C-ring 149 retains the assembly together.

Figure 4:
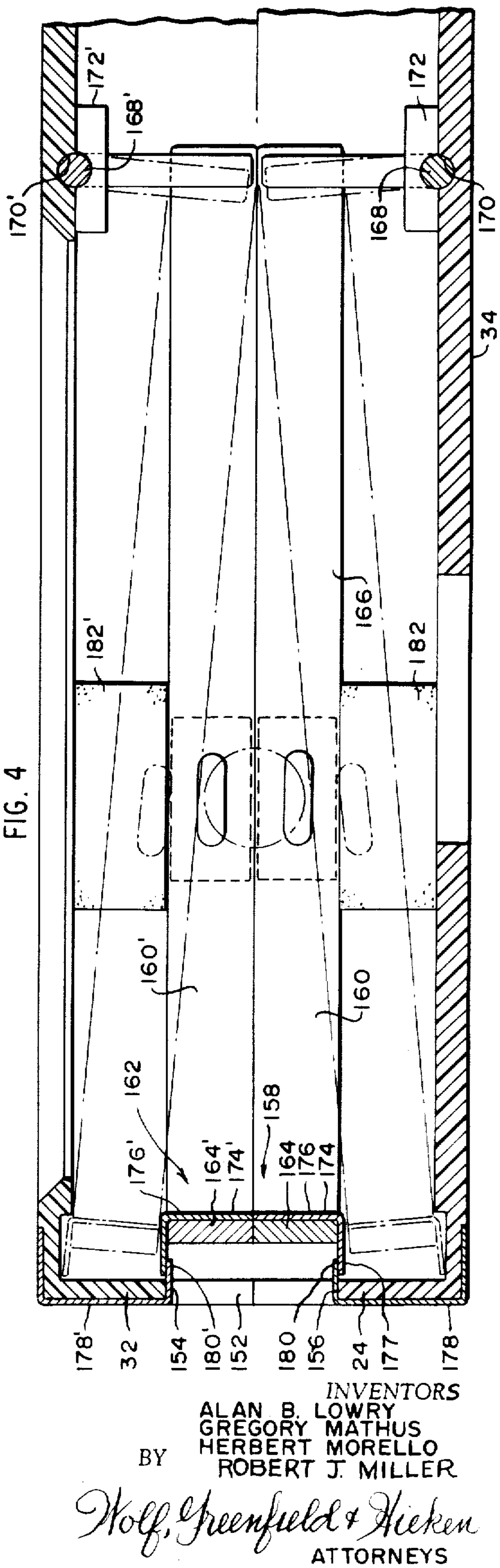
FIG. 4 is an enlarged fragmentary cross-sectional view of the cartridge.

The idler rollers 130 and 132 describe a course for a portion of the tape loop 150 immediately adjacent the front walls 24 and 32 of the cover and base respectively, and an opening 152 provided in the front walls is of sufficient width to draw out of the cartridge the course of tape between the two idler rollers. In FIG. 4 the opening 152 is shown defined by the spaced edges 154 and 156 of the walls 24 and 32. As is explained in greater detail below, the tape is withdrawn through the opening 152 when either recording or reading the tape while the reels remain in the cartridge. A door assembly 158 is provided to close the opening 152 when the cartridge is not in use and prevents contaminants from entering the cartridge interior.

The door assembly 158 includes a pair of U-shaped halves 160 and 162 which are identical, and only the half 160 is described. The half 160 includes a closure wall 164 and a pair of side arms 166 which are joined together at their ends by a pivot wire 168. A shallow groove 170 is provided in the wall 34 of the cover 10 which positions the wire 168, and a pair of pillow blocks 172 span the wire 168 at its ends to create a fixed fulcrum for the door half 160. The closure wall 164 carries an L-shaped plate 174 having a main face 176 secured to the closure wall 164 and a flange 177 which serves as a stop in combination with channel member 178 that encloses the front of the wall 32. The upper leg 180 of the channel 178 extends inwardly of the top edge 156 of the wall 32 and is in the path of the flange 177 as the door half 160 moves upwardly to the closed position. The flange 177 and leg 180 not only cooperate as a stop for the door half, but seal the opening as well.

Figure 6:
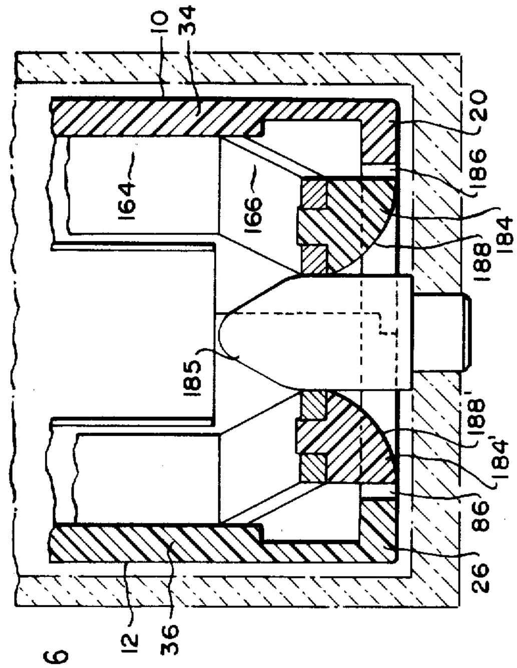
FIG. 6 is a fragmentary detail view showing the manner in which the doors are opened.
Figure 5:
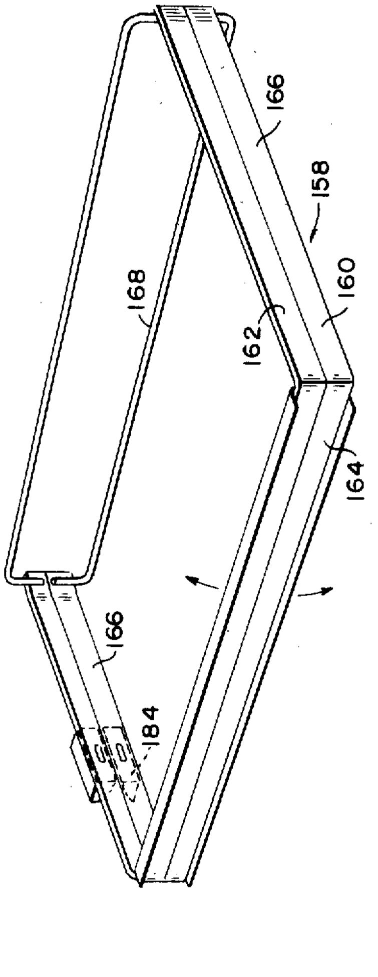
FIG. 5 is a perspective view of the cartridge door mechanism.

A rubber block 182 is disposed beneath the arm 166 of the U-shaped member 160 so as to urge the door closure wall 164 to the closed position with its flange 177 engaging the leg 180. A cam block 184 is secured to the outer surface of the arm 166 and is exposed outside of the cartridge in the slot 186 provided in the side wall 20 of the cover. The cam 184 has an inclined surface 188 which, in reaction to a force applied from the side in the direction of the arm 166 causes the arm to move against the bias of the rubber block 182 and carry the door closure 164 away from the opening 152. A mechanism for accomplishing this is suggested in FIG. 6, including a finger 185 which extends through the slot 186 and acts upon the cam block 184. It will be appreciated that the two door halves are identical, and thus each includes a closure wall which come together as shown in FIG. 4 to seal the opening 152. Each carries a cam block of identical form so that each of the door halves are forced into an open position as suggested by the broken lines in FIG. 4 in response to a properly directed force against the cam. It will also be appreciated that the rubber blocks 172 which urge the doors to the closed position also substantially cover the slots 186 in the side walls 26 and 20 so as to prevent contaminants from entering the case through that opening. Rather than repeat the description of the other door half, like elements in that assembly have been identified by primed numbers corresponding to the numbers of the half 160.

Figure 8:
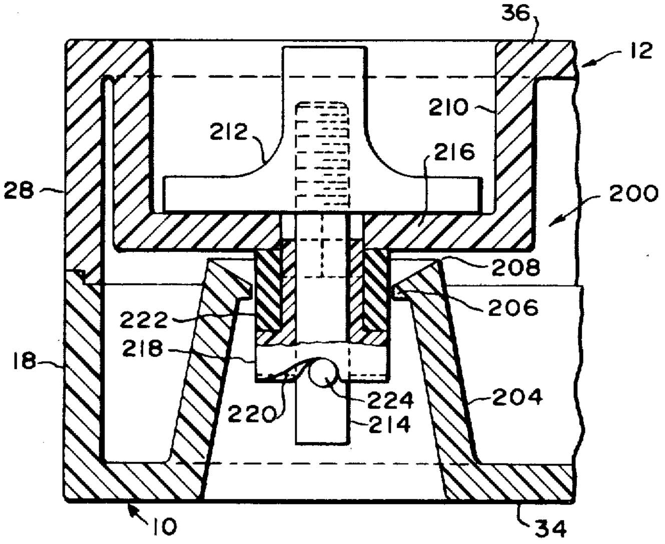
FIG. 8 is an enlarged cross-sectional view of one of the cartridge locks.

The two halves of the case 10 and 12 as stated above are hinged together by the piano hinge 33. The cartridge is locked in the closed position by a pair of fasteners 200 and 202 located adjacent the side walls 18 and 28 of the cover and base respectively when the cartridge is closed. The locks employed are in themselves not unique, and a variety of different forms may be used. The locks illustrated are the standard Vibrex-type fasteners having an expandable grommet that serves as the locking element. It will be noted in FIGS. 1 and 8 that a pair of cylindrical collars 204 are carried on the wall 34 of the cover 10 adjacent the wall 18, and each is provided with an inwardly extending shoulder 206 adjacent its open end 208. A shallow well 210 is provided for each lock in the outer surface of the wall 36, which well receives a rotatable handle 212. Describing one lock, a shaft 214 is secured to and rotates with the handle 212 and extends through the wall 216 of the well into the interior of the cartridge. A cam member 218 having a cam surface 220 is secured to the wall 216 against rotation and is provided with an opening through which the shaft 214 extends. The cam member 218 serves to retain expandable grommet 222 against the wall 216 of the well. Cross pin 224 is anchored in the end of shaft 214 and rotates with it under the influence of the handle 212. The pin 224 acts upon the cam surface 220 to cause the cam member to move axially toward the wall 216 so as to expand the grommet 222. It will be appreciated that when the cover and base 10 and 12 are in the closed position, the grommet 222 extends into the collar 204 behind the shoulder 206, and when the handle 212 is rotated to expand the grommet, it locks behind the shoulder 206 so as to lock the cover and base of the cartridge in the closed position. The lock described is of course duplicated and the parts are identified by primed numbers.

Having described in detail the cartridge of this invention, a typical use for it will be described. However, it is to be understood that the cartridge may be used with other forms of equipment and in combination with other devices, and this description is in no way to limit the breadth of this invention.

Figure 3:
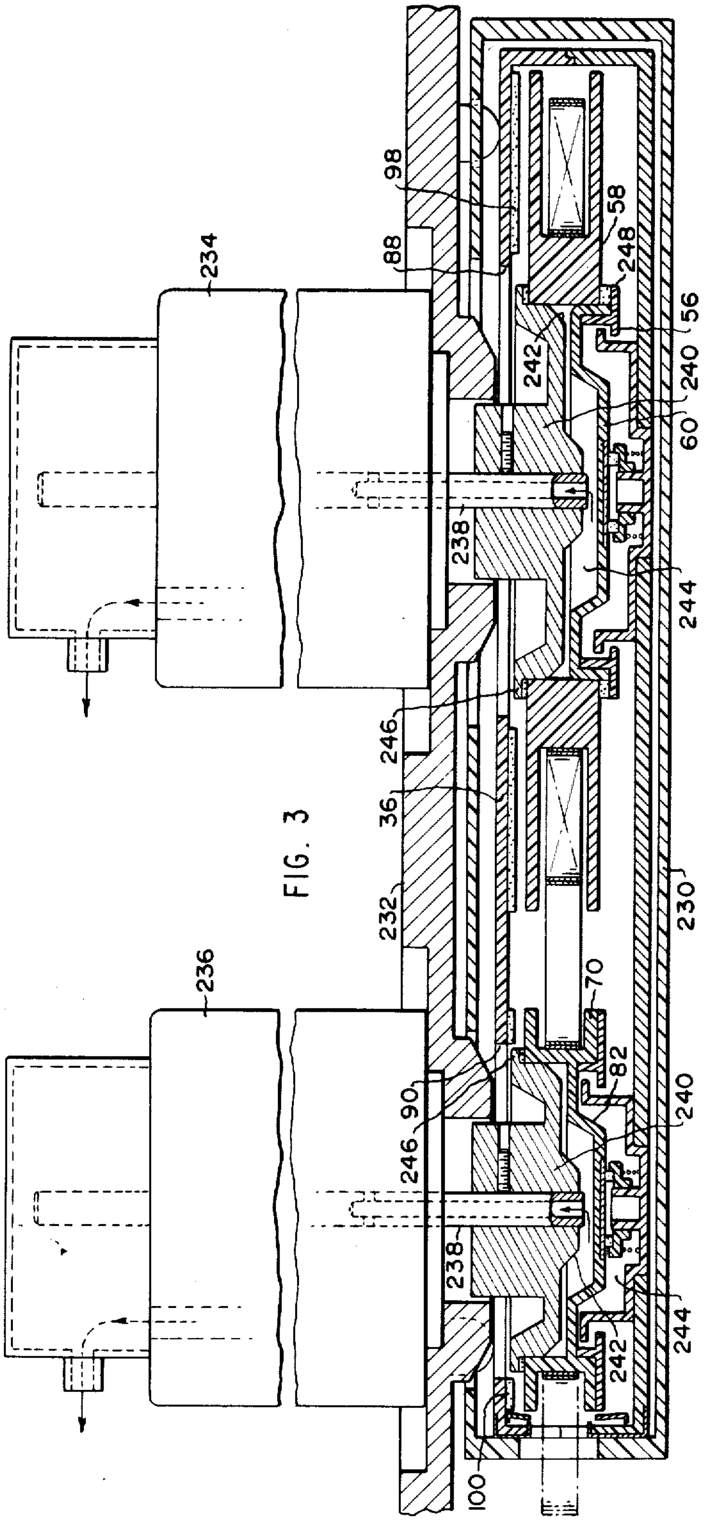
FIG. 3 is a cross-sectional view of the cartridge shown in FIG. 2 mounted on the drive of an input machine with which it may be used.

In FIG. 3 a typical drive and support system for the cartridge is suggested. In that drawing, a drawer 230 is shown to house the cartridge. The drawer 230 is mounted adjacent a panel 232 which in turn supports a pair of drive motors 234 and 236, for the supply reel 58 and take-up reel 70 respectively. The motors of each include a hollow tubular shaft 238 which may be connected through suitable means (not shown) to a vacuum pump. Pinned to each shaft is a drive spindle 240 which in turn engage the respective reel hubs to impart rotation to them. It will be noted in FIG. 3 that the spindles 240 have an outer diameter slightly smaller than the openings 88 and 90 in the wall 36. Consequently, when the drawer 230 is moved against the panel 232, the spindles 240 extend into the cartridge and engage the hubs of the reels. It will also be noted that each spindle in the embodiment shown is provided with a beveled face 242 which serves to align the respective reel hubs with the motor shafts so that they may be engaged in the position shown in the drawing. The freedom of axial and lateral movement provided for each reel on its stabilizer system enables the reel in each instance to shift so as to align itself with the motor shaft. When the spindles 240 move into the cartridge through the openings in the wall 36 and engage the reels in the manner shown, they unseat the reels from the rubber brake rings 98 and 100 so that the reels are free to rotate on their bearing supports.

The spindles 240 of the motors also serve to define vacuum chambers 244 in combination with the reel hubs and the imperforate supports 60 and 82. Sealing gaskets are provided on the outer flanges 246 of the spindles 240 as well as on the outer flange 248 of the ring 56 in association with the supply reel so as to form seals about the edges of the reel hubs. The vacuum chambers 244 in communication with the hollow shafts 238 enable a vacuum pump (not shown) to draw a vacuum in the space between the reels and spindles, which causes the reels to be drawn tightly on the spindles 240 so as to rotate with them.

Figure 9:
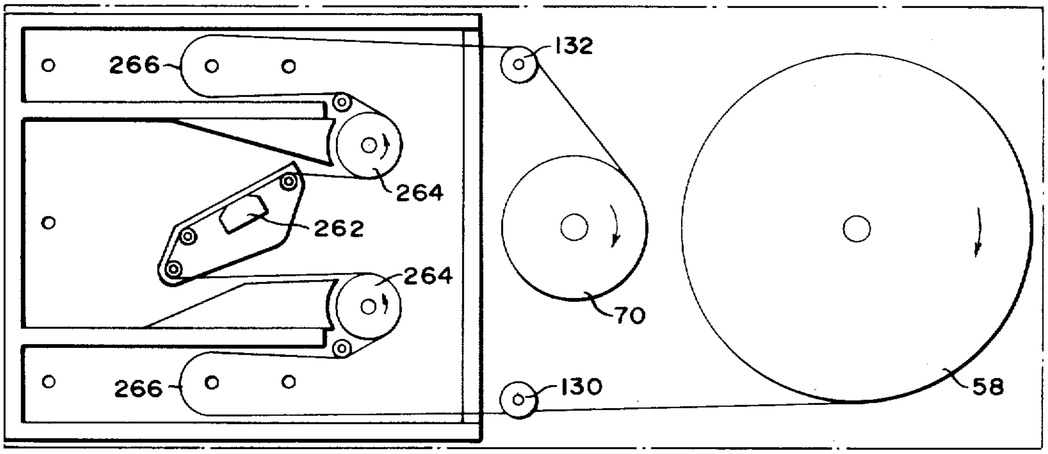
FIG. 9 is a diagrammatic view of a tape deck with which the cartridge may be used.

In FIG. 9 a cartridge is shown disposed in operative relationship with a tape deck of the type with which it may be used. In that figure, the supply reel 58 and the take-up reel 70 are shown along with the idler rollers 130 and 132. In the operative position, the course of tape between the two idler rollers is drawn out of the case through the opening in the front wall uncovered by the open door 158 and onto the deck 260 which carries a recording and/or reading head 262 and rotating capstans 264. A vacuum may be applied to the loops 266 in the tape beyond the capstans to maintain the proper tension for the tape about the head 262. It will be appreciated that the flanges on the idler rollers 130 and 132 are so oriented as to properly position the tape with respect to the open door so that the tape will not rub against either side of the cartridge opening. It will also be appreciated in connection with FIG. 3 that as the tape winds from the supply reel 58 to the take-up reel 70, it may build up on the take-up reel to a diameter that exceeds that which may be contained on that reel within the cartridge. Consequently it may extend through the opening and above the deck 260 as is suggested by the broken lines in FIG. 3. However, before the cartridge is removed from the drawer 230 the tape should be rewound on the supply reel 58.

Having described in detail one embodiment of this invention and the manner in which it may be utilized, those skilled in the art will appreciate that many modifications may be made of the invention without departing from its spirit. The drive and deck disclosed in connection with the use of the cartridge forms the subject matter of a separate application Serial No. 93,467 filed Nov. 27, 1970.

What is claimed is:

1. A tape cartridge comprising
   a cover and a base respectively having top and bottom walls and having a peripheral edge wall,
   a supply reel stabilizer system provided in the cartridge toward the back between the top and bottom walls for releasably receiving a tape reel,
   a take-up reel stabilizer system in the cartridge adjacent the front between the top and bottom walls,
   an opening in the front of the peripheral wall through which the tape may be withdrawn out of the cartridge between travel from the supply to the take-up reel,
   and means in the cartridge adjacent the front for supporting a course of tape connecting the tape wound on the supply and take-up reels adjacent the opening in a position to be withdrawn through it,
   said opening in the front enabling convolutions of tape wound on the take-up reel to project out of the cartridge.

2. A tape cartridge as described in claim 1 further characterized by
   a door movable in the cartridge for closing the opening when the cartridge is not in use.

3. A tape cartridge as described in claim 2 further characterized by
   an opening in at least one of the top and bottom walls for providing access to the hub of one of the reels.

4. A tape cartridge as described in claim 3 further characterized by
   a pair of openings in at least one of the top and bottom walls for providing access to the hubs of each of the reels.

5. A tape cartridge as described in claim 1 further characterized by
   said supply reel stabilizer system including a plate for engaging one side of a supply reel,
   and means enabling said plate to move axially and laterally to permit the supply reel engaged by the plate to similarly move.

6. A tape cartridge as described in claim 5 further characterized by
   said take-up reel stabilizer system including means enabling the take-up reel to move axially and laterally in the cartridge.

7. A tape cartridge as described in claim 6 further characterized by
   said stabilizer systems being mounted on one of the top or bottom walls of the cartridge,
   spring means forming part of the systems for urging each reel toward the opposite wall,
   and means on said opposite wall to resist rotation of the reels.

8. A tape cartridge as described in claim 7 further characterized by
   openings provided in said opposite walls for enabling motor spindles to extend into the cartridge to rotate the reels and push the reels off the means to resist rotation.

9. A tape cartridge as described in claim 2 further characterized by
   said door carrying an actuating member on its outer surface accessible from outside the cartridge enabling the door to be opened automatically from the outside.

10. A tape cartridge as described in claim 2 further characterized by
   said door having a pair of closure walls that move toward one another on the inside of the peripheral wall to close the opening and that move away from one another to uncover the opening,
   a pair of arms carrying each closure wall and pivotally anchored at their ends away from the front,
   and means biasing the doors to the closed position.

11. A tape cartridge as described in claim 1 further characterized by
   said means in the cartridge adjacent the front wall being idler rollers positioned adjacent the ends of the opening.

12. A tape cartridge as described in claim 2 further characterized by
   said door carrying an actuating member accessible from outside the cartridge enabling the door to be opened automatically from the outside.

13. A tape cartridge as described in claim 1 further characterized by
   means forming part of the stabilizing systems and intended to engage the supply and take-up reels for enabling said reels to rotate freely within the cartridge.

14. A tape cartridge as described in claim 1 further characterized by
   a supply reel separate from the supply reel stabilizer system removably carried by said system and adapted to be lifted from said system when the cartridge is open.

15. A tape cartridge as described in claim 14 further characterized by
   a take-up reel forming an integral part of the take-up reel stabilizing system and permanently attached thereto.

16. A tape cartridge as described in claim 14 further characterized by
   a first drive opening formed in one of the walls and aligned with the axis of the supply reel stabilizer system for enabling a motor spindle to extend into the cartridge and engage the supply reel.

17. A tape cartridge as described in claim 16 further characterized by
   a take-up reel forming an integral part of the take-up reel stabilizing system and permanently attached thereto,
   and a second drive opening formed in the same wall as the first opening and aligned with the axis of the take-up reel system for enabling a motor spindle to extend into the cartridge and engage the take-up reel.

18. A tape cartridge as described in claim 14 further characterized by a take-up reel on the take-up reel stabilizing system, and magnetic tape carried by the supply reel and extending across the means adjacent the front and connected to the take-up reel.

19. A tape cartridge as described in claim 1 further characterized by at least one rotatable spindle, said spindle including means defining a passage therethrough, and vacuum producing means connected to the passage in order to draw one of either said supply or take-up reels to the rotatable spindle.

20. A tape cartridge as described in claim 19 further characterized by said supply reel stabilizer system including a plate for engaging one side of a supply reel, said plate being imperforate and sealing against the hub of a supply reel placed on it so that a vacuum chamber may be formed when the opposite side of the reel hub is sealed against its corresponding rotatable spindle.

21. A tape cartridge as described in claim 20 further characterized by the stabilizer system for the take-up and supply reels being substantially the same.

22. A tape cartridge as described in claim 19 wherein said at least one spindle includes a surface surrounding the passages towards which the reel moves to at least partially seal the vacuum space defined between the spindle and reel.

23. A tape cartridge as described in claim 19 further characterized by first and second rotatable spindles for contacting the supply and take-up reels, respectively, each spindle including means defining a passage therethrough, and vacuum producing means connected to the passages in order to draw said supply and take-up reels to their corresponding rotatable spindles.

24. A tape cartridge as described in claim 23 further characterized by said supply reel stabilizer system including a plate for engaging one side of a supply reel, said plate being imperforate and sealing against the hub of a supply reel placed on it so that a vacuum chamber may be formed when the opposite side of the supply reel hub is sealed against its corresponding rotatable spindle, and said take-up reel stabilizer system including a plate integrally formed with said take-up reel, said last-recited plate being imperforate so that a vacuum chamber may be formed when the opposite side of the take-up reel hub is sealed against its corresponding rotatable spindle.

25. A tape cartridge as described in claim 24 further characterized by annular seal means secured intermediate said first and second rotatable spindles and their corresponding reels when said vacuum producing means has drawn said reels toward said spindles.

26. A tape cartridge comprising, a cover and a base respectively having top and bottom walls and having a peripheral edge wall, a supply reel stabilizer system provided in the cartridge between the top and bottom walls for releasably receiving a tape supply reel, a take-up reel stabilizer system in the cartridge adjacent the supply reel stabilizer system between the top and bottom walls, an opening in the peripheral edge wall adjacent the take-up reel stabilizer system and through which the tape may be with-drawn out of the cartridge between travel from the supply reel to the take-up reel, said opening enabling convolutions of tape wound on the take-up reel to project out of the cartridge, and means in the cartridge adjacent said opening for supporting a course of tape extending between said supply and take-up reels in a position to be withdrawn through said opening.

27. A tape cartridge as set forth in claim 26 comprising means defining an opening in at least one of the top and bottom walls for providing access to one of the supply and take-up reel stabilizer systems, said stabilizer system comprising plate means for engaging an inner portion of said reel, said plate means being imperforate and defining in part a vacuum chamber with a rotatable spindle that may pass through said opening engaging said stabilizer system.

28. A tape cartridge as set forth in claim 27 wherein one of said stabilizer systems includes the supply reel stabilizer system, said plate means of said supply reel stabilizer system engaging one side of said supply reel, said plate means sealing against the hub of the supply reel placed on it, said plate means and supply reel in part defining the vacuum chamber with a rotatable supply reel spindle.

29. A tape cartridge as set forth in claim 26 comprising means defining a pair of openings in at least one of the top and bottom walls for providing access to each of the reels, said supply reel stabilizer system including a plate for engaging one side of the supply reel, said plate being imperforate and sealing against the hub of the supply reel placed on it so that a vacuum chamber may be formed when the opposite side of the reel hub is sealed against a rotatable spindle capable of being passed through said opening providing access to said supply reel.

30. In a tape cartridge having top and bottom walls and a peripheral edge wall, a supply reel stabilizer system disposed between the top and bottom walls for releasably receiving a tape reel and at least partially secured to one of the top and bottom walls, a take-up reel stabilizer system disposed between the top and bottom walls and at least partially secured to one of the top and bottom walls, both said supply reel stabilizer system and said take-up reel stabilizer system being at least partially secured to the same wall of said top and bottom walls, at least one rotatable spindle associated with one of said supply reel stabilizer system and said take-up reel stabilizer system, said spindle having means defining a passage therethrough, said spindle including means for providing sealing engagement of said spindle with its associated stabilizer system, and vacuum producing means connected to the passage in order to draw one of either said supply or take-up reels to the rotatable spindle.

31. In a tape cartridge as set forth in claim 30 wherein said take-up or supply reel includes an inner annular surface and said spindle includes an annular flange adapted to sealingly contact the inner annular surface to at least in part define the vacuum chamber.

32. In a tape cartridge as set forth in claim 30 comprising means defining an opening in at least one of the top and bottom walls for providing access to one of the supply and take-up reel stabilizer systems, said stabilizer systems each comprising plate means for engaging an inner portion of said reel, said plate means being imperforate and defining in part a vacuum chamber with the rotatable spindle.

33. In a tape cartridge having top and bottom walls and a peripheral edge wall, a supply reel stabilizer system disposed between the top and bottom walls for releasably receiving a tape reel, a take-up reel stabilizer system disposed between the top and bottom walls, both said supply reel stabilizer system and said take-up reel stabilizer system being at least partially secured to one of said top and bottom walls, said supply reel stabilizer system including plate means for engaging an inner portion of said supply reel and means secured to one of said top and bottom walls for limiting the movement of said plate means in three dimensions, said take-up reel stabilizer system including plate means integral with said take-up reel and means secured to one of said top and bottom walls for limiting the movement of said plate means in three dimensions.

34. In a tape cartridge as set forth in claim 33 wherein each said stabilizer system includes a spring and bearing assembly disposed between the plate means and the means for limiting.

* * * * *